United States Patent
Ball et al.

[15] 3,651,946
[45] Mar. 28, 1972

[54] ROTARY FILTERS

[72] Inventors: Harry Ball, Piscataway; Henry A. Steward, Califon, both of N.J.

[73] Assignee: Technical Fabricators, Inc., Nutley, N.J.

[22] Filed: Dec. 31, 1969

[21] Appl. No.: 889,580

[52] U.S. Cl. .........................................210/387
[51] Int. Cl. .........................................B01d 33/12
[58] Field of Search .........................210/387, 122

[56] References Cited

UNITED STATES PATENTS

| | | | |
|---|---|---|---|
| 2,823,806 | 2/1958 | Harlan | 210/387 |
| 3,372,811 | 3/1968 | Arnold et al. | 210/387 |
| 3,332,553 | 7/1967 | Casson | 210/387 X |

Primary Examiner—Samih N. Zaharna
Attorney—Burgess, Ryan & Wayne

[57] ABSTRACT

A rotary filter machine has a rotary drum with a perforated peripheral wall supported on a horizontal shaft and extending into a tank adapted to contain slurry to be filtered. A continuous flexible filter paper sheet is continuously led from a source of supply to the drum, wound around the drum so as to travel with the drum through the slurry to be filtered and then stripped from the drum. Suction in the drum draws the liquid from the slurry through the filter paper sheet, and through the perforated peripheral wall of the drum to the interior of the drum and is conducted away from the machine. The solids filtered out of the slurry are entrapped in and on the filter paper sheet and are carried away from the machine with the paper sheet for disposal after stripping from the drum.

5 Claims, 5 Drawing Figures

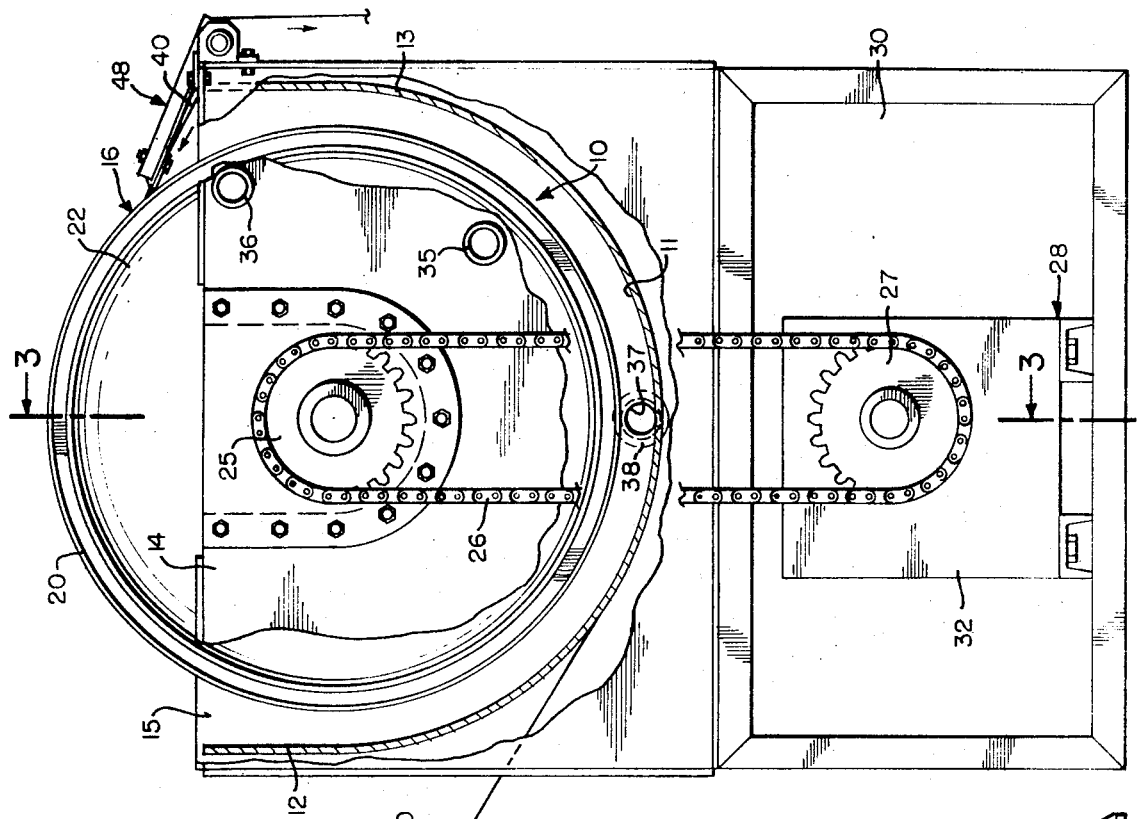
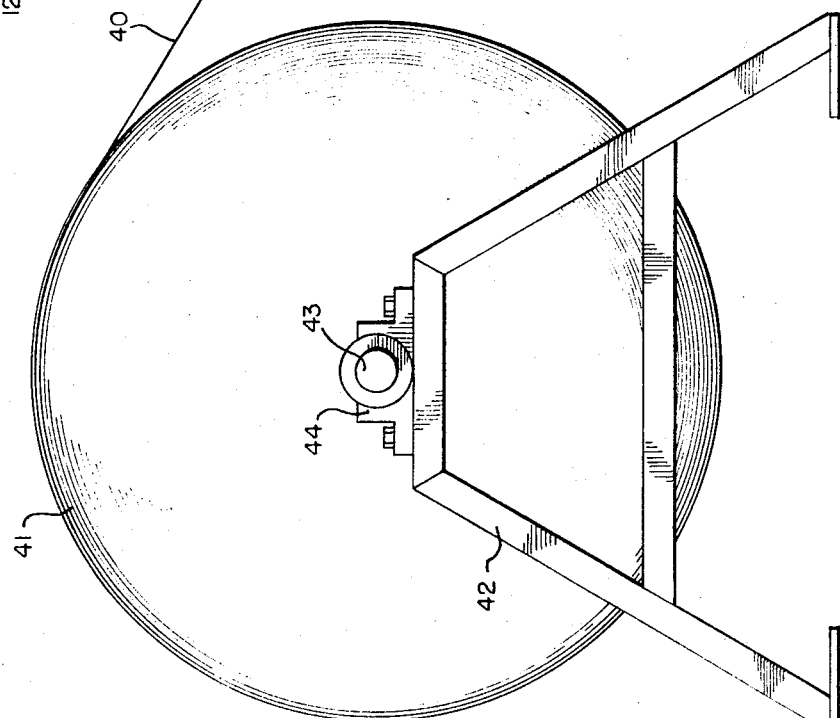
FIG. 1
INVENTORS
HARRY BALL
HENRY A. STEWARD
BY
Burgess, Ryan & Hicks
ATTORNEYS

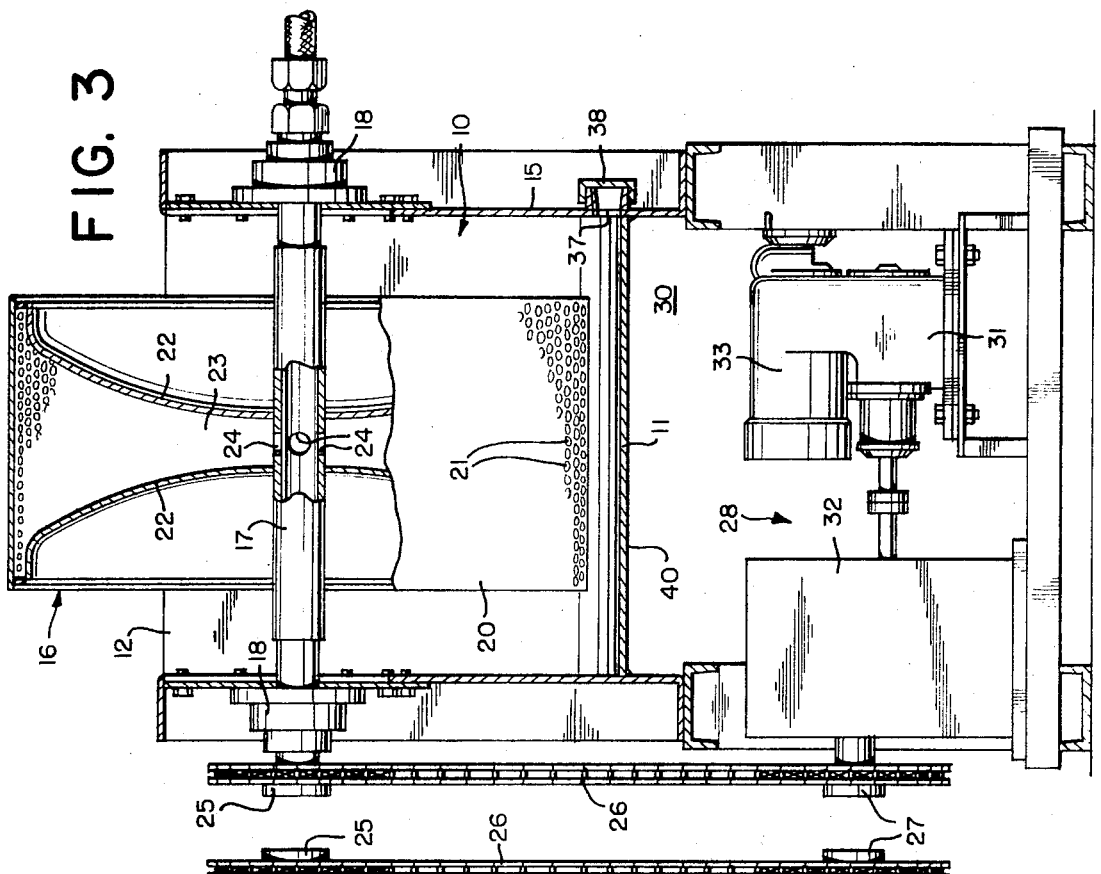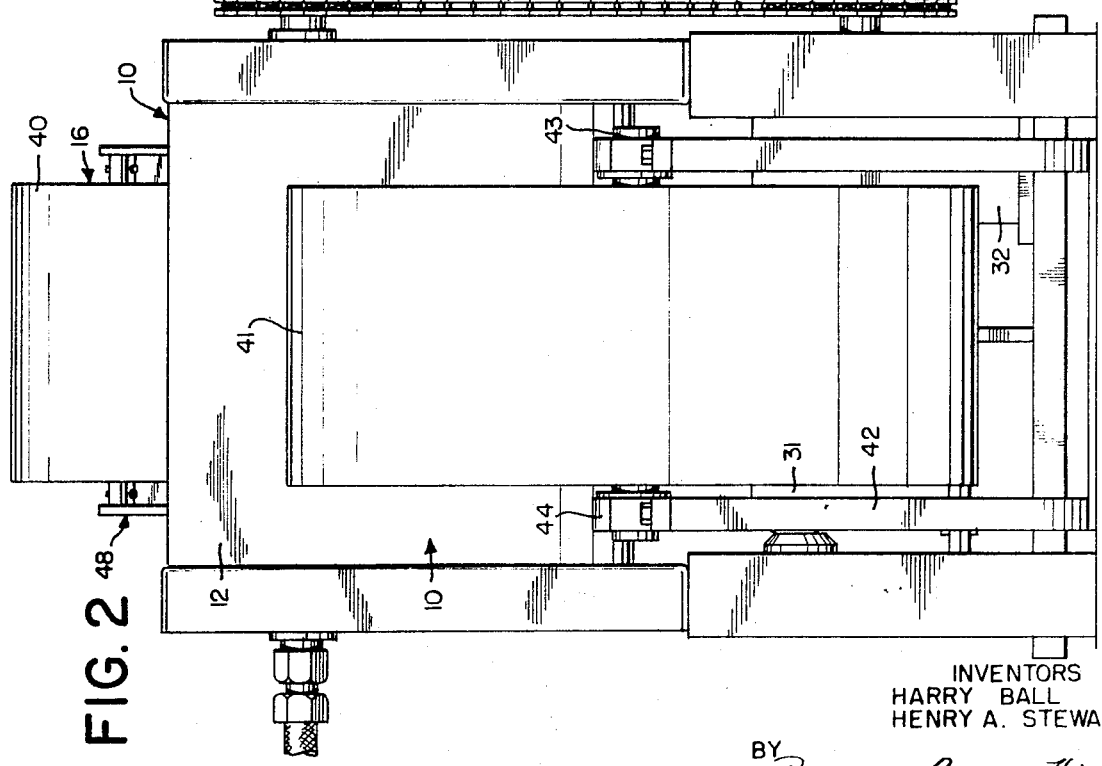

INVENTORS
HARRY BALL
HENRY A. STEWARD

ROTARY FILTERS

The present invention relates to a filter device of the rotary type.

In one conventional type of rotary filter device, a rotary drum on a horizontal axis, peripherally perforated, and extending in a tank adapted to contain slurry to be filtered, is first prepared for filtering by covering its perforated surface with a fabric and then applying over this fabric a layer of filter material in finely divided form, such as diatomaceous earth, powdered coal, and perlite, to form a filtering coating cake on the drum. The layer of filter material is applied to the drum by sucking through the fabric covered surface of said drum, a slurry containing the filter material in suspension so that this material is filtered from the liquid in the slurry and is permitted to build up on this surface as a precoat having a substantial thickness of 3 to 4 inches.

In normal filtering operations, the drum, precoated as described is immersed in a tank containing the liquid to be filtered, and this liquid is drawn through the precoat into the interior of the drum by vacuum, while the suspended impurities in said liquid are filtered out and collected on the precoat. A knife or scraper continuously shaves off from 0.001 to 0.010 of an inch of this precoat along with the solids filtered out and collected on this precoat, while the drum is rotating and while filtration is taking place. Depending on the thickness of precoat cut off, and the rate of cut off, the initial precoat of diatomaceous earth or similar filter material, will last anywhere from 8 hours to 3 days. This necessitates stopping the whole filtration cycle and re-precoating the drum, after all of the precoat has been shaved off. Auxiliary equipment, such as a tank and mixer for the precoat slurry and a pump are usually required for the purpose. The precoating operation may take anywhere from 1 hour to 2 hours to complete.

One object of the present invention is to provide a new and improved rotary filter device, which does not require a precoating operation akin to that described, and which can carry on filtering operations for long intervals with minimum delays and interruptions.

For carrying out the objectives described, the filter device of the present invention is designed to employ as the filter medium a preformed continuous flexible sheet of filter paper. As far as certain aspects of the invention are concerned, the filter paper sheet may be made of any suitable filtering material, such as asbestos, synthetic fibers and chemical pulp, but this sheet is desirably made chiefly from wood pulp, and is preferably ordinary newsprint. Means are provided for training this paper sheet from a supply roll around a perforated rotary filter drum for continuous rotary travel therewith during filtering operations. The filter drum extends in a tank into which the liquid to be filtered is continuously delivered, and its interior is maintained under vacuum. As the drum with the paper sheet wrapped around it continuously rotates in the slurry to be filtered, the liquid filtrate is sucked through the paper sheet and through the drum perforations, and carried out of the drum through a hollow horizontal shaft supporting the drum, while the solids or semisolids in suspension are filtered out by the paper sheet and collected thereon. The paper sheet with the separated solids thereon is peeled from the drum and trained away from the filter device for discard or other disposition.

By the operation described, fresh paper sheet is continuously being delivered to the periphery of the drum, while the impurity laden paper is being continuously retired from the drum. By using a preformed paper sheet instead of a drum precoating of diatomaceous earth or similar conventional type of filter material, the paper sheet carrying the separated solids can be burned, an operation not possible with the use of these conventional filter materials.

The filtering operation using the device of the present invention can be carried out continuously with no long pauses for precoating, as in the case of conventional devices and techniques. The only interruption would be that necessary to rethread a paper sheet from a fresh paper roll, after the last paper roll has been used up. If newsprint is employed as the filter paper, this is available in rolls 5 feet wide and 4 feet in diameter. In pilot plant tests of the new and improved filter device described, a standard roll of newsprint lasted approximately 3 months and the rate of filtration was comparable with the rate of filtration through a diatomaceous earth drum precoat.

Various other objects, features and advantages of the present invention are apparent from the following description and from the accompanying drawings, in which FIG. 1 is a front elevation of a rotary filter device embodying the present invention;

FIG. 2 is an end elevation of the filter device;

FIG. 3 is a section of the filter device taken on lines 3—3 of FIG. 1;

Figure 4:
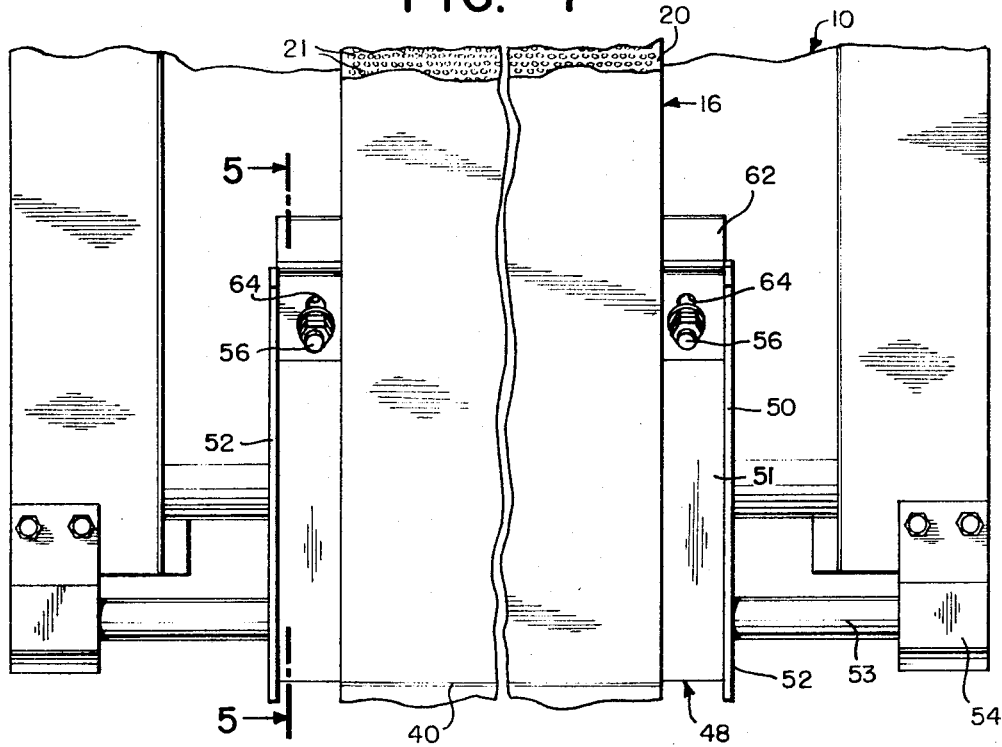
FIG. 4 is a top plan view of a portion of the filter device in the region where the filter paper sheet is moved to and away from the periphery of the rotary drum.

Referring to the drawings, the filter device embodying the present invention comprises a tank 10, provided with a bottom arcuate wall 11, vertical end walls 12 and 13 forming upward continuations of the bottom wall, and vertical side walls 14 and 15. Extending in the tank 10 is a rotary drum 16 supported on and secured to a hollow horizontal shaft 17, journaled in bearings 18 mounted on the side tank walls 14 and 15. The drum 16 has a cylindrical peripheral wall 20, concentric with the bottom tank wall 11. This drum wall 20 has perforations 21, which may vary in size and spacing; in a specific construction in which the width of the drum 16 is 15 inches and its diameter is 30 inches, the perforations 21, may, for example, be one-fourth inch in diameter and be located on ⅜-inch centers.

The drum 16 has end disc walls 22, extending between its peripheral wall 20 and the hollow shaft 17, and rigidly secured to said peripheral wall and said shaft, as for example, by welding, to define a vacuum chamber 23, communicating with the interior of said shaft through holes 24 in said shaft. The end drum walls 22 curve from the ends of the peripheral wall 20 towards each other as they approach the shaft 17, so as to interfere as little as possible with the slurry capacity of the tank 10, while defining a streamlined passageway for the filtrate liquid on its way to the shaft.

The hollow shaft 17 extends at one end through the side tank wall 15 and leads to a suction pump (not shown) by which the filtrate is sucked from the vacuum chamber 23 by the action of the pump delivered to a storage tank (not shown) for reuse or for disposal in any desirable manner in purified state. The other end of the shaft 17 extends through the other side wall 14 of the tank 10 and carries a sprocket wheel 25, which is driven through a chain 26 from a sprocket wheel 27, on the output side of a mechanism 28 for driving the drum 16. This drive mechanism 28 is housed in a chamber 30 below the tank 10 and comprises a motor 31, a speed reduction gear unit 32, and a device 33 for varying selectively the output speed of the motor, as for example, a Reeves drive. The drive mechanism 28 rotates the drum 16 continuously during filtration at a selected rate depending on the desired rate of filtration.

The tank 10 has an inlet 35 in its side wall 14 for the slurry to be filtered, an overflow outlet 36 in said side wall in the upper section of the tank, and a drain 37 in side tank wall 15 near the bottom of the tank, normally closed by a cap 38 as shown.

The fresh filter material in the form of a continuous flexible paper sheet 40 is constantly delivered to the periphery of the drum 16 for enwrapment therearound during the filtration cycle, and this sheet, after it is laden with the solids or semisolids filtered from the slurry, is constantly led away from the peripheral wall 20 of the drum for discard or for subsequent processing, if so desired. The paper sheet 40 can be made from any suitable filter material, as described above, but is desirably made essentially of wood pulp and preferably is newsprint, which is a cheap machine-finished paper, made chiefly from wood pulp and used mostly for newspaper. This newsprint is usually supplied in rolls four feet in diameter and five feet wide. The newsprint 40 may be used in this wide available form, if the filter device has a tank and a filter drum of comparable width, or may be slit longitudinally into appropriate widths, according to the dimensions of the filter device. For example, in filter devices of the smaller type, with, for example, a drum 15 inches wide and a tank 24 inches wide, the conventional newsprint may be divided into four segments to form four rolls, 15 inches wide and 4 feet in diameter.

The paper sheet 40 is supplied from a roll 41, supported on a stanchion 42 for unreeling rotation and provided with an axle 43 journaled in bearings 44 on said stanchion. The sheet 40 is guided around the outer side of the arcuate bottom wall 14 of the tank 16, and along the outer side of the end tank wall 13, and is diverted across the upper edge 45 of said tank wall 13 and towards the perforated peripheral wall 20 of the drum 16.

Figure 5:
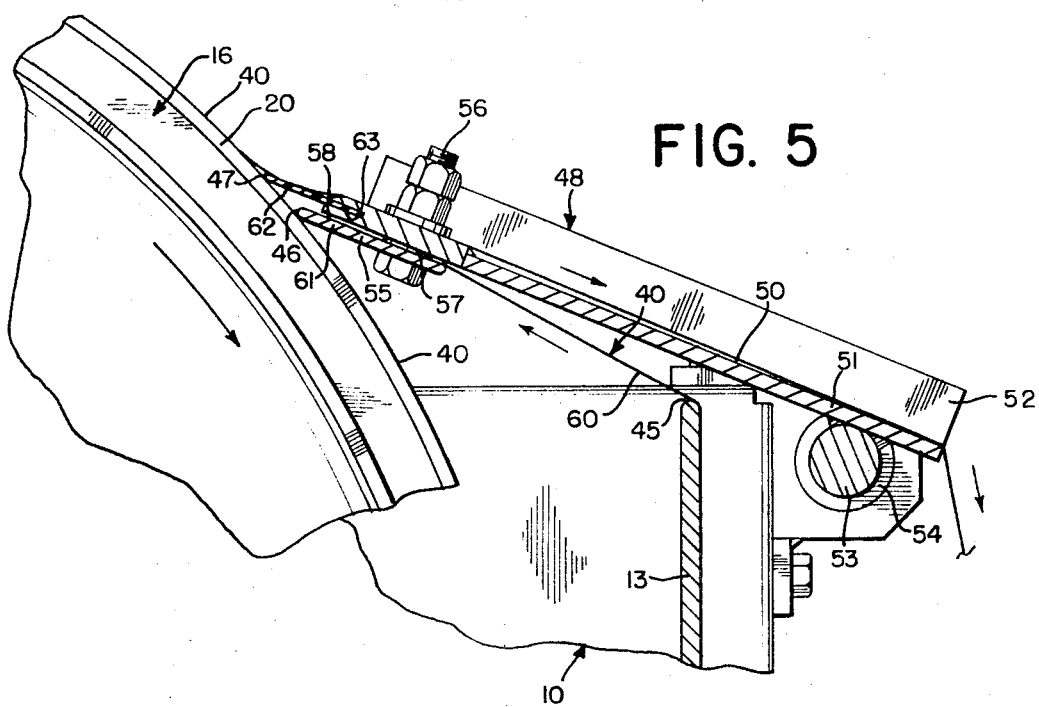
FIG. 5 is a section of the filter device taken on lines 5—5 of FIG. 4.

The paper sheet 40 is directed towards and away from closely adjacent regions 46 and 47 of the peripheral drum wall 20 by a guide device 48 comprising a runway 50, inclined downwardly and away from the sheet exit region 47 of said drum wall, and is shown in the form of a channel with a bottom wall 51 and side walls 52. The rear end of the runway 50 has rigidly secured to the underside thereof, as for example, by welding, an axle 53 journaled in bearings 54 secured to the outside of the tank 16. The runway 50 is thereby pivotally supported for angular adjustment in relation to the peripheral drum wall 20. On the underside of the runway 50 near its forward end is a guide plate 55 secured to the runway by bolts 56. This guide plate 55 is parallel to the bottom wall 51 of the runway 50 and is spaced therefrom by washers 57 on the bolts 56 or by shims, to form a guideway 58, through which the feed-in-section 60 of the fresh paper 40 is guided in its course to the peripheral drum wall 20. The forward edge 61 of the guide plate 55 is rounded and lies near the paper entry region 46 of the peripheral drum wall 20, and the fresh paper sheet 40 is sharply turned over this rounded guide plate edge and is wrapped around the drum 16 clockwise (FIG. 5) for almost its entire circumference and emerges laden with filtered solids from the paper exist region 47 of said drum wall. The forward end of the runway wall 51 carries a scraper or knife 62 impinging on the peripheral drum wall 20 at its paper exit region 47 and serving to strip the paper sheet 40 laden with filtered solids from said drum wall and to guide it along the runway 50 for discard or disposal in any desired way. The knife 62 is made of wear resisting material that will not abrade the peripheral surface of the drum 16, as for example, nylon, and is secured to the forward end of the runway 50, as for example, by press-fitting in a slot 63 in the forward end of the bottom runway wall 51.

The position of the guide plate 55 can be adjusted edgewise in relation to the peripheral surface of the drum 16, and for that purpose, the heads of the bolts 56 are welded to the underside of the plate and pass through elongated slots 64 in the bottom runway wall 51.

In the operation of the filter device, the liquid with the solids to be filtered out suspended therein, and constituting a slurry is delivered continuously to the tank 10 through its inlet 35 at a rate to maintain the level of the slurry above the drum shaft 17, but below the overflow outlet 36. At the same time, the drum 16 is driven clockwise (FIG. 1) at a speed to effect efficient filtration at an efficient rate. As the drum 16 rotates, it draws the dry paper sheet 40 from the supply roll 41 by its friction engagement with said sheet, and this sheet is pulled and guided along the arcuate bottom tank wall 11, upwardly along the outside of the end tank wall 13, across the upper edge 45 of said tank wall 13, through the guideway 58 and to the paper input region 46 of the peripheral drum wall 20, and is then turned sharply across the edge 61 of the guide plate 55 and wrapped clockwise (FIG. 5) around almost the entire circumference of this drum wall to the paper exit region 47. As the enwrapping paper sheet 40 enters the slurry in the tank 10, the slurry is sucked through the paper sheet and the liquid filtrate passes through the perforations 21 in the peripheral wall 20 of the drum 16 and enters the vacuum chamber 23, where it is drawn into the hollow drum shaft 17 for discharge therefrom, through the suction action of the pump (not shown), while the solids suspended in the slurry are filtered out and entrapped on and in the paper sheet 40. The fresh dry paper sheet 40 enters the slurry on the side of the drum 16 nearest the end wall 13, traverses the body of slurry while in conforming contact with the peripheral drum wall 20 and while filtering the solids out of the slurry, and emerges from the slurry on the opposite side of the drum loaded with entrapped solids filtered from the slurry. The paper sheet 40 so laden dries by the suction in the drum 16 as it moves toward the paper exit region 47 and is stripped from the periphery of the drum 16 by the knife 62 and carried away along the runway 50 for burning or for disposal in any other way. Since the paper entry region 46 and the paper exit region 47 of the drum 16 are close together, little vacuum is lost through the gap on the periphery of the drum between these regions.

The filtration operation described can be carried out for long periods with one paper supply roll 41, and when the supply is used up, the tank 10 can be emptied by opening the drain 37, and a paper sheet 40 from a fresh supply roll 41 can be threaded through the machine for resumption of filtration operations. The operation for preparing the filter machine for resumption of filtration is a simple one requiring little or no previous experience, and does not require the measurement of diatomaceous earth into a slurry tank, the addition of water, the mixing and then the filtration of this earth on to the fabric covered drum to precoat it as in known operations; all of these known operations are time consuming, are required to be carried out by experienced personnel and prepare the filter machine for only comparatively short filtering runs.

The clarity imparted to the liquid in the slurry by the newsprint filtering operation described, is comparable to that employing diatomaceous earth. Pilot test operations with a filter machine of the present invention have indicated that the filtration of a slurry containing iron hydroxide, which is a slimy gelatinous material, and very difficult to filter, can be carried out at a rate and with a completeness comparable to that carried out with a diatomaceous earth precoat filter and with much greater economy.

The present invention has application to the solving of those filtrations problems, where the solids to be filtered are very slimy, sticky or small and would have a tendency to blind a typical precoated rotary vacuum filter cloth. It can be employed, for example, in industrial plants where the liquid in the slurry must be purified of suspended solid before being reused or returned to a body of this liquid, which is required or desired to be maintained in unpolluted state.

What is claimed is:

1. A filter device for separating solids from a slurry comprising
   a tank having an inlet and an outlet for said slurry, said tank having a bottom wall, side and end walls;
   a hollow rotary drum supported with its axis substantially horizontal and extending into said tank for immersion of its lower section into the slurry, said drum having a cylindrical peripheral wall with perforations thereover;
   a top edge of each end wall located in a horizontal plane above said drum axis;
   supply means located adjacent said tank and including a roll of paper unwindable therefrom in a continuous sheet;
   means continuously feeding said sheet from said supply means to the outer side of said bottom tank wall and further along the outer side of one of said end walls up to one of said top edges of said end walls;
   a guide device positioned above and adjacent to said one of said top edges, said guide device having plate means mounted on a lower surface thereof to form a gap therebetween, said plate means extending up to the periphery of said drum, said sheet positioned to extend from said one of said top edges through said gap to be wrapped around substantially the entire periphery of said drum;

said guide device having stripping means mounted thereon above said plate means and adjacent thereto to extend up to the periphery of said drum, said wrapped-around sheet being detachable from said drum by said stripping means to be thereupon fed onto a top surface of said guide device; and suction means continuously operable within said drum to keep said wrapped-around sheet pressed thereagainst and to cause the solids from said slurry to separate onto said sheet as the liquid of the slurry passes through said sheet and said perforations for discharge from said drum.

2. A filter device according to claim 1 in which said top surface of said guide device is formed as a channel.

3. A filter device according to claim 1 in which said plate means terminates in a paper entrance edge region closely adjacent to said drum periphery, said stripping means terminates in a knife element providing a paper exit edge region closely adjacent to said drum periphery, and said edge regions provide a seal for said suction.

4. A filter device according to claim 3 in which said guide device is mounted on an axle for pivotal adjustment of said edge regions with respect to said periphery to provide the seal.

5. A filter device according to claim 2 in which second adjustment means is provided for said mounting of said plate means on said channel to provide transversal positioning thereof.

* * * * *